April 23, 1957     E. E. SEEGER     2,789,385
ARTICULATED FISHING PLUG
Filed March 3, 1955
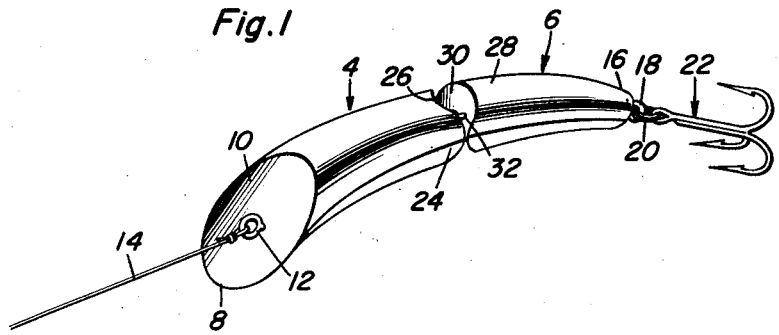
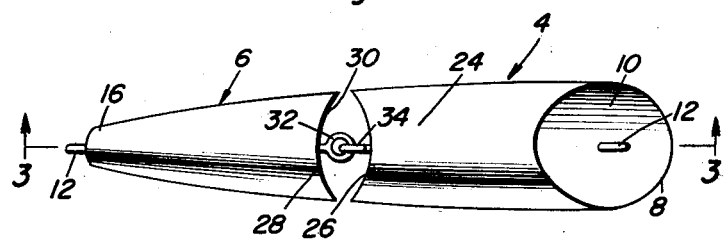
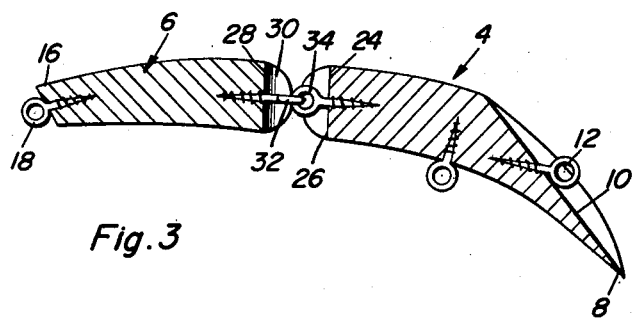
*Ernest Ensyo Seeger*
INVENTOR.
BY

United States Patent Office 2,789,385
Patented Apr. 23, 1957

2,789,385

ARTICULATED FISHING PLUG

Ernest Ensyo Seeger, Royal Oak, Mich.

Application March 3, 1955, Serial No. 491,958

2 Claims. (Cl. 43—42.15)

The present invention relates to an improved fishing plug designed for effective casting and trolling, and has more particular reference to an articulated sectional plug wherein relative movements between the sections serve to render the plug life-like in action.

An object of the present invention is to provide a simple, economical and distinctive construction in which unique head and tail sections are hingedly connected and function to provide a novelly constructed and performing plug which is, it is believed, a practical and worth-while contribution to the art.

With a view toward best achieving the intended and desired result, the trailing end of the head section has a substantially semicircular vertically disposed notch which provides one concavity, and the leading end of the tail section has a corresponding notch which provides a second or complemental concavity. Using eye screws or similar equivalent means and axially and hingedly connecting the notched ends, a novel coaction of surfaces is had. That is to say, the concave surfaces face each other and are spaced longitudinally and thus provide an intervening substantially ellipsoidal water passage between the notched ends wherein the cooperating turbulent water currents function to agitate the sections and serve to impart relative movements thereto, giving the lure the appearance of a life-like bait.

In addition to the above, certain other features and advantages will be rendered evident considering, of course, the specification, claims and drawings collectively.

In the drawings:

Figure 1 is a perspective view of an articulated lure or plug showing the complemental sections in general axial alignment;

Figure 2 is a top plan view of the plug with the line and hook omitted; and

Figure 3 is a section on the line 3—3 of Figure 2.

The aforementioned head section is denoted by the numeral 4, while the tail section is denoted at 6. These sections may be of appropriate size and materials. They are preferably of the shape and general proportions shown in the drawings. Considering the plan showing in Figure 2, it will be noticed that as an over-all structure, the plug is elongate and is elliptical in cross-section for a substantial portion of its length. The largest cross-section is adjacent the leading end, and the smaller cross-section at the trailing end. Thus, the plug tapers gradually from the front or leading end to the rear or trailing end. The leading end is best brought out on Figures 2 and 3, where it will be seen that it is obliquely cut and slants downwardly and forwardly, or, conversely, upwardly and rearwardly. The extreme tip portion 8 is curved down in respect to the principal longitudinal axis of the over-all plug, and this tends to cause the plug to dive and descend into the water when it is retrieved. The slanting surface is also transversely concave as at 10, and hence, it is thus a scoop-like baffle which channels the water upwardly and over the crest or top of the plug. At the center, there is an eye screw 12 for attachment of the fishing line 14. The smaller trailing end of the tail section is denoted at 16, and it is of any appropriate construction and provided with an eye screw 18 carrying a coupling or ring 20 which, in turn, carries the multiple pronged fishhook 22. The principal novelty, as already touched upon, has to do with the cooperating adjacent ends of the respective sections 4 and 6. The rearward end of the head section is denoted at 24, and it has a vertical arcuate recess or notch 26 formed therein which provides a desired concavity. The forward end 28 of the tail section has a similar vertical notch or recess 30, and this provides a second concavity. These cavities open toward or face one another, and they are spaced apart a desired distance and operatively connected by way of cooperating axially spaced eye screws 32 and 34 which are connected together in the manner illustrated in the drawings. It follows that the space between the adjacent ends 28 and 24 is substantially ellipsoidal in plan, that is, when the two sections are approximately in axial alignment with each other.

Since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. An articulated fishing lure comprising a buoyant plug elongated and generally elliptical in cross section for a substantial portion of its length, largest in cross-section adjacent its leading end, gradually decreasing in cross-section toward the trailing end, and embodying a head section and complemental tail section, the leading end of the head section slanting forwardly and downwardly at an oblique angle and being transversely concave in a manner to scoop and channel the water upwardly and rearwardly, the rearward end of said head section having a vertically disposed arcuate recess providing a rearwardly facing channel-like concavity, the forward end of the tail section having a corresponding vertically disposed arcuate recess providing a complemental forwardly facing channel-like concavity, and means interposed between and hingedly connecting said forward and rearward ends, said concavities opening toward and facing each other and being spaced longitudianlly to define a substantially ellipsoidal water passage between the rearward end of the head section and the forward end of the tail section when said sections are in general alignment.

2. The structure defined in claim 1 and wherein the upper and lower channel portions of the respective recesses are substantially unobstructed and open through the respective dorsal and ventral surfaces of the respective sections.

References Cited in the file of this patent

UNITED STATES PATENTS

| | | |
|---|---|---|
| 1,607,107 | Weller | Nov. 16, 1926 |
| 1,708,015 | Goble | Apr. 9, 1929 |
| 1,791,316 | Jordan | Feb. 3, 1931 |
| 1,828,574 | Neukam | Oct. 20, 1931 |
| 2,606,388 | Craft et al. | Aug. 12, 1952 |
| 2,700,239 | Ellis | Jan. 25, 1955 |